United States Patent [19]

Woo et al.

[11] Patent Number: 4,528,366

[45] Date of Patent: Jul. 9, 1985

[54] PRODUCTION OF POLYTRIAZINES FROM AROMATIC POLYCYANATES WITH COBALT SALT OF A CARBOXYLIC ACID AS CATALYST

[75] Inventors: Edmund P. Woo, Midland; David V. Dellar, Sanford, both of Mich.

[73] Assignee: The Dow Chemical Company, Midland, Mich.

[21] Appl. No.: 580,406

[22] Filed: Feb. 15, 1984

Related U.S. Application Data

[63] Continuation-in-part of Ser. No. 425,358, Sep. 28, 1982, abandoned.

[51] Int. Cl.³ .............................................. C08G 73/06
[52] U.S. Cl. .................................... 528/422; 544/180; 544/193
[58] Field of Search ................. 528/422; 544/180, 193

[56] References Cited

U.S. PATENT DOCUMENTS

| | | | |
|---|---|---|---|
| 3,694,410 | 9/1972 | Oemke | 260/47 R |
| 3,817,920 | 6/1974 | Langager | 260/47 R |
| 4,028,393 | 6/1977 | Rotloff et al. | 260/453 |
| 4,046,796 | 9/1977 | Rotloff et al. | 260/453 |
| 4,059,567 | 6/1978 | Sundermann et al. | 260/47 R |
| 4,094,852 | 6/1978 | Sundermann et al. | 260/37 N |
| 4,110,364 | 8/1978 | Gaku et al. | 528/322 |
| 4,195,132 | 3/1980 | Sundermann et al. | 521/155 |
| 4,371,689 | 2/1983 | Gaku et al. | 528/422 |

FOREIGN PATENT DOCUMENTS 1526035 7/1975 United Kingdom .

OTHER PUBLICATIONS

Chemical Abstracts, vol. 63, (1965), 5849b.
Chemical Abstracts, vol. 63, (1965), 14705e.

*Primary Examiner*—Harold D. Anderson
*Attorney, Agent, or Firm*—Norman L. Sims

[57] ABSTRACT

This invention is a process for the preparation of polytriazines comprising contacting aromatic polycyanates in the presence of a catalytic amount of a cobalt salt of a $C_{6-20}$ carboxylic acid at a temperature between about 20° C. and about 200° C.

15 Claims, No Drawings

PRODUCTION OF POLYTRIAZINES FROM AROMATIC POLYCYANATES WITH COBALT SALT OF A CARBOXYLIC ACID AS CATALYST

CROSS-REFERENCE TO RELATED APPLICATION

This application is a continuation-in-part of copending application Ser. No. 425,358, filed Sept. 28, 1982, now abandoned.

BACKGROUND OF THE INVENTION

This invention relates to a process for the preparation of polytriazines. More specifically, it relates to novel catalysts for the preparation of polytriazines from aromatic polycyanates.

It is known from Sundermann et al., U.S. Pat. No. 4,094,852, June 13, 1978, that aromatic cyanates can be polymerized to prepare polytriazine polymers. Such polymers are prepared by contacting the aromatic cyanates with suitable catalysts at elevated temperatures. It is taught that suitable catalysts include acids, bases, salts, nitrogen and phosphorus compounds, for example, Lewis acids such as $AlCl_3$, $BF_3$, $FeCl_3$, $TiCl_4$, $ZnCl_2$, $SnCl_4$; proton acids such as HCl, $H_3PO_4$; aromatic hydroxy compounds such as phenol, p-nitrophenol, pyrocatechol, dihydroxy naphthalene, sodium hydroxide, sodium methylate, sodium phenolate, trimethylamine, triethylamine, tributylamine, diazobicyclo-(2,2,2)-octane, quinoline, isoquinoline, tetrahydroisoquinoline, tetraethyl ammonium chloride, pyridine-N-oxide, tributylphosphine, phospholine-$\Delta^3$-1-oxa-1-phenyl, zinc octoate, tin octoate, zinc naphthenate and mixtures thereof.

Oehmke, U.S. Pat. No. 3,694,410, Sept. 26, 1972, teaches that chelates of metal ions of the nonionic type or the ionic type, with 1 to 6 or more chelate rings, can catalyze the preparation of polytriazines from aromatic polycyanates.

It is desirable to use a catalyst in the preparation of polytriazines from aromatic polycyanates in which the polymerization time is short.

SUMMARY OF THE INVENTION

This invention is a process for the preparation of polytriazines comprising contacting aromatic polycyanates in the presence of a catalytic amount of a cobalt salt of a $C_{6-20}$ carboxylic acid at a temperature between about 20° C. and about 200° C.

The polytriazines of this invention can be used as cure-in-place resins or fabricated in the form of shaped articles, where thermal stability, chemical inertness and solvent resistance is desirable or required.

DETAILED DESCRIPTION OF THE INVENTION

Catalysts for the preparation of polytriazines from aromatic polycyanates which afford shorter polymerization times than heretofore known have been discovered. These catalysts are cobalt salts of $C_{6-20}$ carboxylic acids. Preferable catalysts are cobalt salts of $C_{6-10}$ carboxylic acids and most preferred are cobalt octoate and cobalt naphthenate. Cobalt naphthenate is prepared by treating cobaltous hydroxide or cobaltous acetate with naphthenic acid. Naphthenic acid is saturated fatty acids derived from the gas-oil fraction of petroleum by extraction with caustic soda solution and subsequent acidification.

The amount of the catalyst which is suitable for this use is that amount which catalyzes the preparation of polytriazines from aromatic polycyanates to the desired degree. A suitable range includes between about 0.001 and 5 percent by weight of the aromatic polycyanates. A preferable range includes between about 0.01 and 1 percent by weight of the aromatic polycyanates. A more preferable range includes between about 0.01 and 0.1 percent by weight of the aromatic polycyanates.

These catalysts are useful in the preparation of polytriazines from any aromatic polycyanate. Desirable aromatic polycyanates include those represented by the formula Ar-(-OCN)$_n$ (I) wherein Ar represents an aromatic radical or an aromatic radical interrupted by one or more bridge members, and n is a number of from 1 to 7.

In one embodiment, the aromatic polycyanates preferably used correspond to the following general formula:

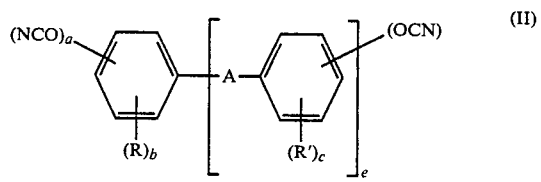

(II)

wherein
each R may be the same or different and represents hydrogen, halogen, straight or branched $C_1$-$C_{20}$ alkyl, phenyl, two adjacent radicals R on the same nucleus may together form a carbocyclic 5- or 6-membered ring, two adjacent radicals R may, together with a hetero atom (O, S, N), form a 5- or 6-membered heterocyclic ring, alkoxy radicals having from 1 to 4 carbon atoms, or alkoxy carbonyl radicals having from 1 to 4 carbon atoms in the alkyl group;

R' has the same meaning as R or represents the group

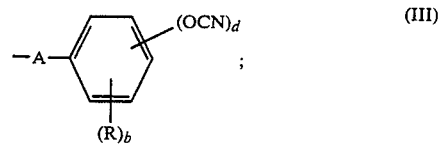

(III)

A represents a direct bond, a $C_1$-$C_{20}$ alkylene group optionally substituted by $C_1$-$C_4$ alkyl or phenyl, a cycloaliphatic or aromatic 5- or 6-membered ring optionally interrupted by oxygen, a sulfonyl group (—$SO_2$—), a carbonyl dioxide group,

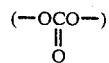

or a carbonyl group;

a represents a number of from 1 to 5 when $e \geq 1$, and a number of from 2 to 5 when $e = 0$;

b represents 5—a when $e \geq 1$ and 6—(a+d) when $e = 0$;

c represents 5—d;

d represents a number of from 0 to 5; and e represents 0, 1, 2 or 3, with the proviso that the sum of a and d is always a number from 2 to 5.

More preferably, the symbols in general formula (II) have the following meanings:

R is hydrogen, fluorine, chlorine or bromine, $C_1$-$C_4$ alkyl, methoxy, ethoxy, methoxy carbonyl, ethoxy carbonyl or butoxy carbonyl;

A is a direct bond, oxygen, a sulfonyl group, a carbonyl group, a carbonyl dioxide group, a methylene group, ethylene group, 2,2-propylene group

or a cyclohexylene radical;

a is the number 1 when $e \geq 1$, and the number 2 when $e=0$;

b is the number 1 or 2, and most preferably the number 1;

c is the number 1 or 2, and most preferably the number 1;

d is the number 0 or 1; and e is the number 0, 1, 2 or 3, with the proviso that $a+d=2$.

The following compounds are specifically mentioned as examples of compounds within one or more of the formulas noted above: 1,3- and 1,4-dicyanatobenzene, 2-tert-butyl-1,4-dicyanatobenzene, 2,4-dimethyl-1,3-dicyanatobenzene, 2,5-di-tert-butyl-1,4-dicyanatobenzene, tetramethyl-1,4-dicyanatobenzene, 2,4,6-trimethyl-1,3-dicyanatobenzene, 4-chloro-1,3-dicyanatobenzene, 1,3-, 1,4-, 1,5-, 1,6-, 1,7-, 1,8-, 2,6- or 2,7-dicyanatonaphthalene, 1,3,5-tricyanatobenzene; 4,4'-dicyanatodiphenyl, 2,2'-dicyanatodiphenyl, 3,3',5,5'-tetramethyl-4,4'-dicyanatodiphenyl, 3,3',5,5'-tetrachloro-4,4'-dicyanatodiphenyl, 3,3',5,5'-tetrachloro-2,2'-dicyanatodiphenyl, 2,2',6,6'-tetrachloro-4,4'-dicyanatodiphenyl, 4,4'-bis-[(3-cyanato)-phenoxy]-diphenyl, 4,4'-bis-[(4-cyanato)-phenoxy]-diphenyl; 2,2'-dicyanato-1,1'-binaphthyl; 4,4'-dicyanatodiphenyl ether, 3,3',5,5'-tetramethyl-4,4'-dicyanatodiphenyl ether, 3,3',5,5'-tetrachloro-4,4'-dicyanatodiphenyl ether, 4,4'-bis-[p-cyanatophenoxy]-diphenyl ether, 4,4'-bis-[p-cyanatophenylisopropyl]-diphenyl ether, 4,4'-bis-[p-cyanatophenoxy]-benzene, 4,4'-bis-[m-cyanatophenoxy]-diphenyl ether, 4,4'-bis-[4-(4-cyanatophenoxy)-phenyl sulfone]-diphenyl ether; 4,4'-dicyanatodiphenyl sulfone, 3,3',5,5'-tetramethyl-4,4'-dicyanatodiphenyl sulfone, 3,3',5,5'-tetrachloro-4,4'-dicyanatodiphenyl sulfone, 4,4'-bis-[p-cyanatophenylisopropyl]-diphenyl sulfone, 4,4'-bis-[(4-cyanato)-phenoxy]-diphenyl sulfone, 4,4'-bis-[(3-cyanato)-phenoxy]-diphenyl sulfone, 4,4'-bis-[4-(4-cyanatophenylisopropyl)-phenoxy]-diphenyl sulfone, 4,4'-bis-[4-cyanatophenyl sulfone)-phenoxy]-diphenyl sulfone, 4,4'-bis-[4-(4-cyanato)-diphenoxy]-diphenyl sulfone, 4,4'-dicyanatodiphenyl methane, 4,4'-bis-[p-cyanatophenyl]-diphenyl methane, 2,2-bis-(p-cyanatophenyl)-propane, 2,2-bis-(3,5-dimethyl-4-cyanatophenyl)-propane, 2,2-bis-(3,5-dichloro-4-cyanatophenyl)-propane, 1,1-bis-[p-cyanatophenyl]-cyclohexane, bis-[2-cyanato-1-naphthyl]-methane, 1,2-bis-[p-cyanatophenyl]-1,1,2,2-tetramethyl ethane, 4,4'-dicyanatobenzophenone, 4,4'-bis-(4-cyanato)-phenoxybenzophenone, 1,4-bis-[p-cyanatophenylisopropyl]-benzene, 2,2',5,5'-tetracyanatodiphenyl sulfone; polycyanic acid esters of novolaks (reaction products of phenol or alkyl- or halogen-substituted phenols with formaldehyde in acid solution) having from 3 to 5 OCN groups and the like.

Aromatic polycyanates are known compounds and may be prepared by the procedure disclosed in Sundermann et al., U.S. Pat. No. 4,094,852 (incorporated herein by reference).

In another preferred embodiment, the aromatic cyanates include polyaromatic cyanates which correspond to the formula

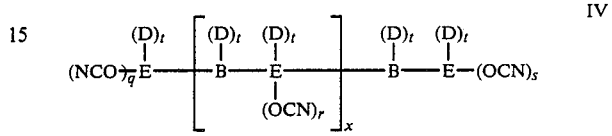

wherein:

B is a $C_{7-20}$ polycyclic aliphatic radical;

D is any nonactive hydrogen-containing substituent;

E is an aromatic radical;

q, r and s are independently in each occurrence the integers 0, 1, 2, or 3; with the proviso that the sum of q, r and s is greater than or equal to 2;

t is independently in each occurrence an integer of between about 0 and 4; and x is a number between about 0 and 5.

Aromatic radical, refers herein to any radical containing an aromatic group. Examples of aromatic radicals include benzene, naphthalene, phenanthracene, anthracene, or biaromatic radicals, or two or more aromatic radicals bridged by alkylene moieties. Preferable aromatic radicals include benzene, naphthalene, biphenyl, binaphthyl, or diphenylalkylene radicals. A more preferred aromatic radical is a benzene radical.

Polycyclic aliphatic radical refers herein to any aliphatic radical which contains two or more cyclic rings. The polycyclic aliphatic radicals may contain one or more double or triple bonds. Preferred polycyclic aliphatic radicals correspond to the formulas

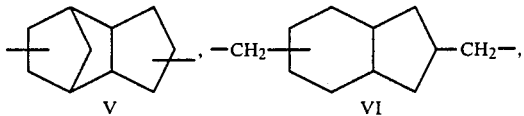

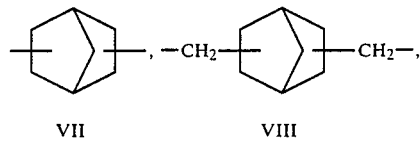

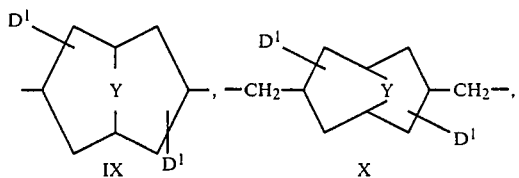

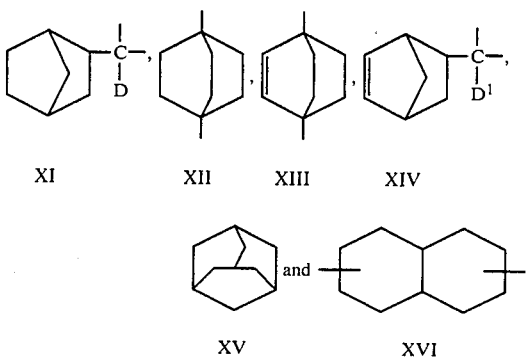

XI  XII  XIII  XIV

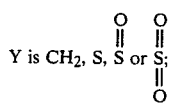

XV  XVI wherein:

$$Y \text{ is } CH_2, S, \overset{O}{\underset{\|}{S}} \text{ or } \overset{O}{\underset{\underset{\|}{O}}{\overset{\|}{S}}};$$

and $D^1$ is $C_{1-5}$ alkyl.

B is more preferably a radical which corresponds to one of the formulas V, VI, VII, VIII, IX, X, XI or XVI with radicals corresponding to formulas V, VI, VII, VIII or XVI being even more preferred, and radicals corresponding to formula V being most preferred.

D is any substituent which can be substituted on an organic hydrocarbon radical, with the exception that the substituent cannot contain an active hydrogen atom. Substituents within the scope of this invention are well-known to those skilled in the art. Active hydrogen atom means herein a hydrogen atom which is bonded to an oxygen, sulfur or nitrogen atom. Examples of substituents within the scope of D include alkyl, alkenyl, alkynyl, aryl, alkaryl aralkyl, halo, alkoxy, nitro, carboxylate, sulfone, sulfide or carbonate moieties. Preferred substituents are $C_{1-10}$ alkyl, $C_{1-10}$ alkenyl, nitro, and halo moieties, with $C_{1-3}$ alkyl, $C_{1-3}$ alkynyl, bromo and chloro moieties being most preferred.

Preferably, q, r and s are independently 1 or 2, and are most preferably 1. Preferably, t is independently an integer of 0, 1 or 2, more preferably 0 or 1, and most preferably 0. Preferably, x is between about 0 and 2 inclusive, and more preferably between about 0 and 1 inclusive.

The polyaromatic cyanates of this invention usually exist as a mixture of many isomers. Further, these polyaromatic cyanates usually are found as a mixture of compounds in which x is between 0 and 5. Usually the number given for x in a particular mixture is an average number.

In one preferred embodiment the polyaromatic cyanates correspond to the formula

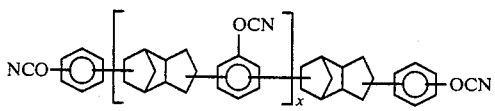

wherein x is a real number of between about 0 and 5, inclusive.

The polyaromatic cyanate esters are generally prepared by contacting a suitable polyaromatic phenol with cyanogen chloride, in the presence of a tertiary amine. It is preferable to prepare the cyanogen chloride in situ by contacting a solution of chlorine in a chlorinated hydrocarbon solvent with an aqueous solution of an alkali metal cyanide. The reaction mixture separates into an organic layer of the chlorinated hydrocarbon containing the cyanogen chloride and an aqueous layer containing the alkali metal chloride salt. Generally, the alkali metal cyanide and chlorine are reacted in a molar ratio of between 1.0:1.0 and 1.0:1.15, preferably between about 1.0:1.0 and 1.0:1.05; and most preferably about 1.0:1.0. An excess of either may result in undesirable consequences, that is, excess chlorine may later react with the phenol, and excess alkali metal cyanide may result in a lower product purity. This contacting is done at a temperature of 0° C. or below, preferably less than −15° C. Above 0° C. the cyanogen chloride will trimerize. Preferable solvents for the chlorine are the aliphatic chlorinated hydrocarbons, such as methyl chloride, chloroform, 1,1,1-trichloroethane and the like. The preferred alkali metal cyanide is sodium cyanide.

The aqueous layer and organic layer are then separated. The separation of the organic layer from the aqueous layer is advantageous as the presence of the aqueous layer in further processing adversely affects the purity of the polyaromatic cyanates eventually prepared.

The organic layer containing the cyanogen chloride is then contacted with a polycyclic bridged hydroxy-substituted polyaromatic compound dissolved in a suitable solvent in the presence of a tertiary amine.

Polycyclic bridged hydroxy-substituted polyaromatic compounds useful in this process correspond to the formula

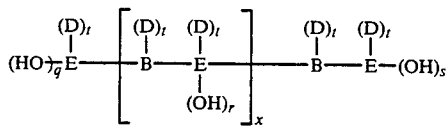

wherein E, B, D, q, r, s, t and x are as defined hereinbefore.

In one preferred embodiment the polycyclic bridged hydroxy-substituted polyaromatic compounds correspond to the formula

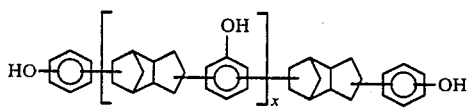

wherein x is as defined hereinbefore. The polycyclic bridged hydroxy-substituted polyaromatic compounds used usually exist as a mixture of isomers. Further, the polycyclic bridged hydroxy-substituted polyaromatic compounds are found as a mixture of compounds in which x is between 0 and 5. Usually the number given for x is an average number. The solvents used for the polycyclic bridged hydroxy-substituted polyaromatic compounds are secondary alcohols, tertiary alcohols, or chlorinated hydrocarbons. Preferred solvents are secondary alcohols or aliphatic chlorinated hydrocarbons, with isopropyl alcohol and methylene chloride most preferred.

The process is preferably done at a temperature of 0° C. or below, more preferably −15° C. or below.

For complete conversion of the hydroxy moieties on the aromatic radicals to cyanate moieties, at least 1 mole of cyanogen chloride for each hydroxy equivalent is needed. It is preferable to use an excess of 10 mole percent of cyanogen chloride for each hydroxy equivalent to insure complete conversion.

The tertiary amine acts as a hydrochloride acceptor, and as a result a tertiary amine hydrochloride salt is a by-product of the process. Generally, at least one mole of tertiary amine for each hydroxy equivalent is used. Hydroxy equivalent refers herein to the average molecular weight of the polycyclic bridged hydroxy-substituted polyaromatic compound divided by the average number of hydroxy moieties per molecule.

The polyaromatic cyanates can be recovered from the reaction solution in the following manner. The reaction mixture is first contacted with a dilute aqueous solution of base, such as a bicarbonate, to remove the excess cyanogen chloride. Then the reaction mixture is contacted with water to remove the tertiary amine hydrogen chloride salt. Thereafter, the reaction solution is contacted with a dilute aqueous acid solution to neutralize any base present. A 1 to 20 weight percent solution of hydrochloride, phosphoric or sulfuric acid can be used, preferably a 5 to 10 weight percent solution. The reaction solution is then contacted with water to remove any impurities which may be present. The reaction solution is dried over a dessicant to remove the water, and the solvent is stripped off.

The polyaromatic cyanate recovered is of surprisingly high purity and can be used directly to prepare polytriazines.

The polycyclic bridged hydroxy-substituted polyaromatic compounds useful in this invention can be prepared by reacting an aromatic compound, containing at least one aromatic hydroxy moiety and one position on the aromatic ring which can be alkylated, with an unsaturated polycyclic aliphatic compound under conditions such that a polycyclic bridged hydroxy-substituted polyaromatic compound useful in this invention is prepared.

Suitable substituted aromatic hydroxy compounds which can be employed herein include any such compounds which contain one or two aromatic rings, at least one phenolic hydroxyl group and at least one ortho or para ring position with respect to a hydroxyl group available for alkylation.

Particularly suitable hydroxy-substituted aromatic compounds which can be employed herein include, for example, phenol, chlorophenol, bromophenol, methylphenol, hydroquinone, catechol, resorcinol, guaiacol, pyrogallol, phloroglucinol, isopropylphenol, ethylphenol, propylphenol, t-butylphenol, isobutylphenol, octylphenol, nonylphenol, cumylphenol, p-phenylphenol, o-phenylphenol, m-phenylphenol, bisphenol A, dihydroxydiphenyl sulfone, mixtures thereof and the like.

The hydroxy-substituted polyaromatic compound is contacted with the unsaturated polycyclic aliphatic compound optionally in the presence of a solvent. Preferred solvents include chlorinated hydrocarbons, aliphatic hydrocarbons, aromatic hydrocarbons and nitro-substituted hydrocarbons. In general the hydroxy-substituted polyaromatic compound is contacted with the unsaturated polycyclic aliphatic compound in a mole ratio of between about 20.0:1.0 and 1.0:1.0, preferably between about 10.0:1.0 and 1.5:1.0.

These reactants are preferably contacted in the presence of a catalyst.

Acid catalysts which can be employed herein include, for example, Lewis acids, alkyl, aryl and aralkyl sulfonic acids, and disulfonic acids of diphenyloxide and alkylated diphenyloxide, sulfuric acid, mixtures thereof and the like. Preferable catalysts are such Lewis acids as $BF_3$ gas, organic complexes of boron trifluoride such as those complexes formed with phenol, cresol, ethanol, acetic acid and the like. Also Lewis acids include aluminum chloride, zinc chloride, stannic chloride, and the like. Also catalysts include, for example, activated clays, silica, silica-alumina complexes, and the like.

In preparing the compounds which contain an average of more than one phenolic hydroxyl group and more than one aromatic ring per molecule, the reaction between the phenolic hydroxyl-containing compounds and the unsaturated hydrocarbons can be conducted at temperatures of from about 33° C. to about 270° C., preferably from about 33° C. to about 210° C.

In the formula Ar$+$(OCN)$_n$, n is preferably an integer of the value of 2 or greater.

The products prepared by the process disclosed herein are polytriazines, which in the simplest terms can be represented by the formula

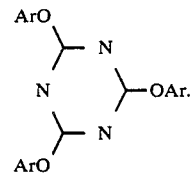

Where n is 1, the product is a trimer of the aromatic cyanates. Where n is 2 or greater, cross-linked polymers are prepared in which a basic unit is a triazine, such as the one shown above.

The polymers prepared by this invention can be homopolymers as well as copolymers formed from two or more of the aromatic polycyanates. One or more monocyanates, wherein n is one, can be used in combination with one or more polycyanates in order to produce polytriazines with modified properties. Such modified properties may be solubility, glass transition temperature, moisture resistance and impact resistance.

This process can be used to prepare completely cured polymers, which are essentially free of cyanate functionalities, and partially cured prepolymers. Such prepolymers are cyanate group-containing polytriazines of liquid, wax-like or solid consistency and are soluble in organic solvents. These prepolymers are highly stable in storage. These prepolymers may be later converted to high molecular weight polytriazines when exposed to polymerization conditions. Prepolymers are prepared to permit easy handling of a resin prior to final use. Further, these prepolymers are useful in the production of coatings on such substrates as metals, ceramics, glass and earthenware, and as impregnating lacquers or laminating resins.

In the preparation of the polytriazines, aromatic polycyanates are contacted in the presence of a catalytic amount of one of the novel catalysts disclosed at a temperature of between about 20° C. and 200° C., optionally in the presence of a solvent. Preferable temperatures are between about 80° C. and 180° C.

The prepolymers are prepared by the same process, except either a lower temperature or a lower amount of catalyst is used, so that the aromatic polycyanates do not completely polymerize.

The rate of polymerization is dependent upon the temperature and the catalyst amount. As either, or both, increase, the rate of polymerization increases. At higher temperatures, a lower amount of catalyst is necessary for the desired amount of polymerization than is necessary at lower temperatures.

The solvent can be any compound which dissolves the aromatic polycyanates and does not interfere with the reaction. Suitable solvents include aromatic hydrocarbons, alcohols and ketones.

The polyfunctional aromatic polycyanates may be combined with the powder-form or fibrous fillers or reinforcing materials either before or after heat treatment of the aromatic polycyanates and by basically any method. For example, it is possible to impregnate powder-form or fibrous fillers or reinforcing materials such as quartz sand or glass cloths, with the aromatic cyanates, optionally in solution. Examples of the solvents which may be used for this purpose and which, generally, have to be removed again afterwards, are inert solvents such as methylene chloride, acetone, methyl ethyl ketone, xylene, ethyl acetate benzene, toluene, tetrahydrofuran, chlorobenzene, dibutyl ether, dimethyl formamide and tetramethylene sulfone.

Suitable fillers and reinforcing materials are, generally, in any powder form and/or fibrous products, for example, of the type commonly used in the production of moldings based on unsaturated polyester resins or epoxide resins. Examples of products such as these are, primarily, granular fillers such as quartz powder, ground shale, asbestos powder, powdered corundum, chalk, iron powder, aluminum powder, sand, gravel and other fillers of this kind, also inorganic or organic fibers, more especially glass fibers in the usual textile forms of fibers, filaments, rovings, yarns, nonwovens, mats and cloths, etc. In this connection, amino silane-based finishes have proven to be particularly effective. It is also possible to use corresponding textile structures of organic, preferably synthetic fibers (polyamides, polyesters) or on the basis of quartz, carbon, metals, etc., as well as monocrystals (whiskers).

The end products combined with fillers or reinforcing materials may be used in particular in vessel and pipe construction by the winding technique, in electrical engineering, in mold construction and tool making and also in the construction of heavily stressed components, in the lightweight construction of vehicles in aeronautical and astronautical engineering.

SPECIFIC EMBODIMENTS

The following examples are included to further illustrate the invention and are not intended to limit the scope of the invention or claims.

PROCEDURE

Aromatic polycyanate samples (2 to 4 g) were poured into aluminum weighing dishes and the exact weight of each sample was determined. Methyl ethyl ketone (5-10 ml) was added to dissolve the aromatic polycyanate. A weighed amount of catalyst was added to each dish and the excess solvent was air evaporated.

Approximately 1-gram samples of the above-described mixture were removed from the dishes and placed on the gel plate, which was set at 177° C. The gel time was then determined for each mixture. Actual gel times were determined to be the time required for aromatic polycyanate to polymerize to a point at which it could no longer be remelted on the gel plate. Shorter gel times indicate higher catalytic activity.

EXAMPLE 1

The gel times of the cyanate compound derived from the bisphenol of dicyclopentadiene, which has a structure represented by the formula:

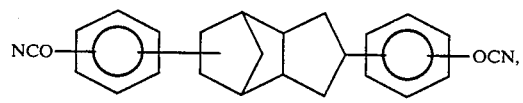

using various catalysts were determined. The results are compiled in Table I.

TABLE I

| Catalyst | Catalyst Concentration (ppm) | Catalyst Concentration (Wt. %) | Gel Time (min.) |
| --- | --- | --- | --- |
| None | — | — | >>60.0 |
| Cobalt octoate | 800 | 0.08 | 0.5 |
|  | 400 | 0.04 | 2.75 |
|  | 200 | 0.02 | 8.25 |
|  | 120 | 0.012 | 21.0 |
| Cobalt naphthenate | 800 | 0.08 | 2.2 |
|  | 400 | 0.04 | 6.7 |
|  | 200 | 0.02 | 20.0 |
| Zinc octoate | 400 | 0.04 | 12.5 |
| Tin octoate | 800 | 0.08 | >40.0 |
| Lead octoate | 800 | 0.08 | 5.5 |
| Cobalt acetylacetonate | 800 | 0.08 | 13.25 |
|  | 400 | 0.04 | 24.25 |
|  | 200 | 0.02 | >45.0 |
| Zinc acetylacetonate | 800 | 0.08 | 5.5 |
|  | 400 | 0.04 | 19.0 |
| Nickel acetylacetonate | 1,600 | 1.06 | >25.0 |
| Novolac | 70,000 | 70.0 | 4.5 |

EXAMPLE 2

The gel times for the polymerization of the aromatic polycyanate compound represented by the structure:

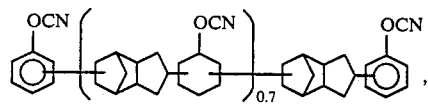

using various catalysts were determined. The results are compiled in Table II.

TABLE II

| Catalyst | Catalyst Concentration (ppm) | Catalyst Concentration (Wt. %) | Gel Time (min.) |
| --- | --- | --- | --- |
| None | — | — | >120.0 |
| Cobalt naphthenate | 40 | 0.004 | 5.65 |
| Cobalt acetylacetonate | 100 | 0.010 | 35.0 |
| Cobalt chloride | 540 | 0.054 | 16.1 |

EXAMPLE 3

Gel times for the polymerization of the dicyanate of bisphenol A, which has a structure represented by the formula:

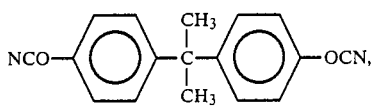

using various catalysts were determined. The results are compiled in Table III.

TABLE II

| Catalyst | Catalyst Concentration (ppm) | Catalyst Concentration (Wt. %) | Gel Time (min.) |
|---|---|---|---|
| Cobalt octoate | 100 | 0.01 | 14.2 |
| Cobalt naphthenate | 100 | 0.01 | 12.5 |
| Zinc octoate | 100 | 0.01 | 29.8 |
| Cobalt acetylacetonate | 100 | 0.01 | 46.8 |
| Cobalt chloride | 2,133 | 2.0133 | 2.16 |

The above examples demonstrate that cobalt octoate and cobalt naphthenate are better catalysts for this process than those taught in the references cited above. In fact, catalytic activity of cobalt octoate and cobalt naphthenate is 3 to 10 times more than that of the catalysts described in the references discussed above.

What is claimed is:

1. A process for the preparation of a polytriazine consisting essentially of contacting an aromatic polycyanate with a catalytic amount of a cobalt salt of a $C_{6-20}$ carboxylic acid at a temperature between about 20° C. and about 200° C. wherein the aromatic polycyanate corresponds to the formula Ar$\text{-(OCN)}_n$ wherein Ar represents an aromatic radical or an aromatic radical interrupted by one or more bridge members and n is a number of from 1 to 7.

2. The process of claim 1 wherein the amount of catalyst is between about 0.001 and 5 percent by weight of the aromatic polycyanate.

3. The process of claim 2 wherein the amount of catalyst is between about 0.01 and 0.1 percent by weight of the aromatic polycyanate.

4. The process of claim 1 wherein the temperature is between about 80° C. and 180° C.

5. The process of claim 1 wherein the catalyst is cobalt octoate.

6. The process of claim 5 wherein the catalyst is cobalt naphthenate.

7. The process of claim 1 wherein the polycyanate corresponds to the formula

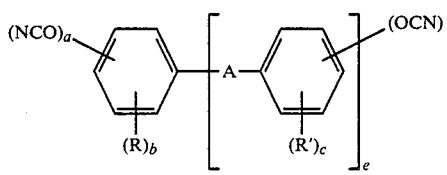

(II)

wherein each R is the same or different and represents hydrogen, halogen, straight or branched $C_1$-$C_{20}$ alkyl, phenyl, alkoxy radicals having from 1 to 4 carbon atoms, alkoxy carbonyl radicals having from 1 to 4 carbon atoms in the alkyl group; or two adjacent radicals R on the same nucleus together form a carbocyclic 5- or 6-membered ring, two adjacent radicals R together with a hetero atom (O, S, N), form a 5- or 6-membered heterocyclic ring;

R' has the same meaning as R or represents the group

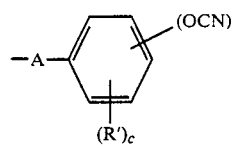

(III)

A represents a direct bond, or A represents a $C_1$-$C_{20}$ alkylene group or said group substituted by $C_1$-$C_4$ alkyl or phenyl, a cycloaliphatic or aromatic 5- or 6-membered ring or said group interrupted by oxygen, a sulfonyl group ($-SO_2-$), a carbonyl dioxide group,

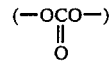

or a carbonyl group;

a represents a number of from 1 to 5 when $e \geq 1$, and a number of from 2 to 5 when $e = 0$;

b represents $5-a$ when $e \geq 1$ and $6-(a+d)$ when $e = 0$;

c represents $5-d$;

d represents a number of from 0 to 5; and e represents 0, 1, 2 or 3, with the proviso that the sum of a and d is always a number from 2 to 5.

8. The process of claim 1 wherein the aromatic cyanate is a polyaromatic cyanate which corresponds to the formula

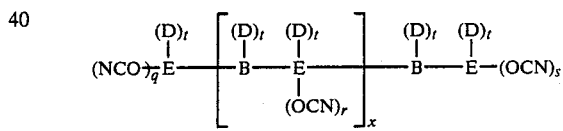

wherein:

E is an aromatic radical;

B is a $C_{7-20}$ polycyclic aliphatic radical;

D is independently in each occurrence any nonactive hydrogen-containing substituent;

q, r and s are independently in each occurrence the integers 0, 1, 2, or 3; with the proviso that the sum of q, r and s is greater than or equal to 2;

t is independently in each occurrence an integer of between about 0 and 4 inclusive; and x is a number between about 0 and 5 inclusive.

9. The process of claim 8 wherein:

E is a benzene, naphthalene, phenanthracene, anthracene, or biaromatic radicals, or two or more aromatic radicals bridged by alkylene moieties;

B is

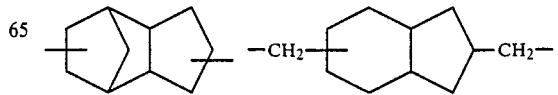

-continued

[structures]

D is an alkyl, alkenyl, alkynyl, aryl, alkaryl, aralkyl, halo, alkoxy, nitro, carboxylate, sulfone, sulfide, or carbonate moiety;
$D^1$ is $C_{1-5}$ alkyl;
Y is $$CH_2, S, \overset{O}{\underset{}{\overset{\|}{S}}} \text{ or } \overset{O}{\underset{\overset{\|}{O}}{\overset{\|}{S}}};$$

q, r and s are independently 1 or 2;
t is independently 0, 1 or 2; and
x is a number between about 0 and 2 inclusive.

10. The process of claim 9 wherein:
E is a benzene, biphenyl, binaphthyl or diphenylalkylene radical;
B is

[structures]

D is a $C_{1-10}$ alkyl, $C_{1-10}$ alkenyl, nitro or halo moiety;
q, r and s are 1;
t is 0 or 1; and
x is a number between 0 and 1 inclusive.

11. The process of claim 10 wherein:
E is benzene;
B is

[structures]

D is a $C_{1-3}$ alkyl, $C_{1-3}$ alkenyl, bromo or chloro moiety; and
t is 0.

12. The process of claim 11 wherein:
B is

[structure]

13. The process of claim 8 wherein the polyaromatic cyanate corresponds to the formula $$NCO-\bigcirc-\left[\bigcirc\!\!\!\bigcirc-\underset{OCN}{\bigcirc}-\bigcirc\!\!\!\bigcirc\right]_x-\bigcirc-OCN$$

wherein x is a real number of between about 0 and 5, inclusive.

14. The process of claim 13 wherein x is a real number of between about 0 and 2, inclusive.

15. The process of claim 13 wherein x is a real number of between about 0 and 1, inclusive.

* * * * *